(12) United States Patent
Kim et al.

(10) Patent No.: US 9,318,752 B2
(45) Date of Patent: Apr. 19, 2016

(54) APPARATUS FOR INSULATING EXPOSED CHARGING PART OF FUEL CELL STACK

(71) Applicants: Hyundai Motor Company, Seoul (KR); YURA CORPORATION CO., LTD., Chungcheongbuk-do (KR)

(72) Inventors: Ju Han Kim, Yongin-si (KR); Byung Ki Ahn, Seongnam-si (KR); Jung Do Shu, Seoul (KR); Young Bum Kum, Seoul (KR); Ki Wook Ohm, Uiwang-si (KR); Gil Woo Jung, Suwon-si (KR)

(73) Assignees: HYUNDAI MOTOR COMPANY, Seoul (KR); YURA CORPORATION CO., LTD., Cheongwon-Gun, Chungcheongbuk-Do (KR)

( * ) Notice: Subject to any disclaimer, the term of this patent is extended or adjusted under 35 U.S.C. 154(b) by 320 days.

(21) Appl. No.: 13/894,966

(22) Filed: May 15, 2013

(65) Prior Publication Data

US 2014/0186746 A1  Jul. 3, 2014

(30) Foreign Application Priority Data

Dec. 28, 2012  (KR) .................. 10-2012-0157098

(51) Int. Cl.
   *H01M 8/02*  (2006.01)
(52) U.S. Cl.
   CPC . *H01M 8/02* (2013.01); *Y02E 60/50* (2013.01)

(58) Field of Classification Search
   CPC ...................................................... H01M 2/04
   See application file for complete search history.

(56) References Cited

U.S. PATENT DOCUMENTS

| | | | |
|---|---|---|---|
| 6,426,465 B1 * | 7/2002 | Kosuge | 174/138 F |
| 2004/0043287 A1 * | 3/2004 | Bando et al. | 429/156 |
| 2006/0178051 A1 * | 8/2006 | Hashida et al. | 439/627 |
| 2014/0158396 A1 * | 6/2014 | Nakayama | 174/110 R |

FOREIGN PATENT DOCUMENTS

| | | |
|---|---|---|
| JP | 2000-340213 A | 12/2000 |
| JP | 2006-120489 A | 5/2006 |
| JP | 2010-257608 A | 11/2010 |
| JP | 2012-064457 A | 3/2012 |
| KR | 10-2010-0099596 A | 9/2010 |
| KR | 10-2011-0134725 A | 12/2011 |
| KR | 10-2012-0040647 A | 4/2012 |
| KR | 10-2012-0079612 A | 7/2012 |
| KR | 10-2012-0081821 A | 7/2012 |

\* cited by examiner

*Primary Examiner* — Barbara Gilliam
*Assistant Examiner* — Nathaniel Zemui
(74) *Attorney, Agent, or Firm* — McDermott Will & Emery LLP

(57) ABSTRACT

An apparatus for insulating a plurality of exposed live parts of a fuel cell stack, includes a plurality of protectors. Each of the plurality of protectors is made of an insulating material and configured to insulate a corresponding one of the plurality of exposed live parts to which a corresponding one of current collector terminals disposed in an end plate of the fuel cell stack and a corresponding one of connections of a busbar are connected.

6 Claims, 8 Drawing Sheets

APPARATUS FOR INSULATING EXPOSED CHARGING PART OF FUEL CELL STACK

CROSS-REFERENCE TO RELATED APPLICATION

This application is based on and claims benefit of priority to Korean Patent Application No. 10-2012-0157098 filed Dec. 28, 2012, the entire contents of which are incorporated herein by reference.

TECHNICAL FIELD

The present inventive concept relates to an apparatus for insulating an exposed live part of a fuel cell stack. More particularly, the present inventive concept relates to an apparatus for insulating an exposed live part of a fuel cell stack, which has an insulating function to prevent a short circuit of charging parts exposed to the outside, has a shape suitable for the configuration of the fuel cell stack and the structure of an electrical connection, and has a function for preventing misassembly to improve assemblability.

BACKGROUND

The configuration of a unit cell of a fuel cell stack will be described below. A membrane electrolyte assembly (MEA) is positioned in the center of the unit cell. The MEA includes a polymer electrolyte membrane capable of transporting hydrogen ions (protons), and catalyst layers such as a cathode and an anode, which are coated on both sides of the electrolyte membrane such that hydrogen and oxygen react with each other.

Moreover, a gas diffusion layer (GDL) and a gasket are sequentially stacked on the outside of each of the cathode and the anode. A separator, in which flow fields are formed to supply and discharge a fuel (hydrogen) and an oxidant (air) and discharge water produced by a reaction, is stacked on the outside of the gas diffusion layer. An end plate for supporting and fixing the above-described components is connected to the outermost end.

The fuel cell stack, in which a plurality of the unit cells configured in the above-described manner are stacked, is mounted in a fuel cell vehicle to drive the vehicle by electricity at a desired voltage generated by the fuel cell stack.

In the fuel cell stack having the above-described configuration, as shown in FIG. 8, an end plate assembly includes an end plate 3 for maintaining a fastening force, an insulating plate 2 for preventing the electricity generated by the fuel cell stack from leaking to the outside, and a current collector 1 and current collector terminals 4 for collecting the electricity generated by the fuel cell stack and transmitting the electricity to the outside.

Moreover, in the case where a plurality of fuel cell stacks are present, a conductive busbar electrically connects the current collector terminals 4 of the end plates to connect the fuel cell stacks.

However, a connection between each of the current collector terminals 4 of the end plate 3 and the busbar is exposed to the outside and is configured as an exposed charging part. Thus, the exposed charging part may be brought into direct contact with a metallic stack enclosure due to crash, deformation, etc. of a vehicle body, thus causing an electrical short circuit, which is very problematic.

The above information disclosed in this Background section is only for enhancement of understanding of the background of the present inventive concept and therefore it may contain information that does not form the prior art that is already known in this country to a person of ordinary skill in the art.

SUMMARY

The present inventive concept provides an apparatus for insulating an exposed live part of a fuel cell stack, which can prevent a short circuit by insulating the exposed live part exposed to the outside, when each of current collector terminals formed in an end plate of the fuel cell stack and a busbar are connected, prevent misassembly, and improve assemblability with a structure of a single shape that can be applied to a variety of output terminals.

One aspect of the present inventive concept relates to an apparatus for insulating a plurality of exposed live parts of a fuel cell stack, including a plurality of protectors. Each of the protectors is made of an insulating material and configured to insulate a corresponding one of the exposed live parts to which a corresponding one of current collector terminals disposed in an end plate of the fuel cell stack and a corresponding one of connections of a busbar are connected.

Each of the protectors may include: a protector body contactable with the end plate and accommodating the corresponding current collector terminal of the end plate fastened by means of a bolt and the corresponding connection of the busbar, and a protector cover connected to the protector body and covering the corresponding exposed live part.

The protector body and the protector cover may be made in the form of a box, respectively, be configured to have a substantially same shape to be commonly applied to a variety of exposed live parts, and provide an insulating function to prevent a short circuit.

The protector body may include a plurality of projections for temporary assembly disposed to face each other at a predetermined interval in the inside of the protector body such that the protector body is temporarily assembled with the corresponding connection of the busbar in an inserting manner without being assembled with the corresponding current collector terminal of the end plate, thus improving assemblability.

The protector may include: a lateral projection disposed on each of both sides of the protector body and having a pair of fastening holes, and a fastening projection disposed on each of both sides of the protector cover to be inserted into each of the fastening holes. The protector body and the protector cover are detachably connected to each other.

The protector may include a direction regulating projection disposed on a lower end of the front side of the protector body, and an arrow-shaped indicator disposed on the front end of the protector cover indicating a direction of the direction regulating projection, thus preventing misassembly of the protector and the busbar.

The protector may include a plurality of contact projections disposed on a bottom of the protector body to prevent vibration noise due to tolerances during assembly of parts.

The protector may further include: a guide projection disposed on each of both ends the protector body, and a misassembly-preventing projection disposed on the protector cover and configured to interfere with the guide projection, thus preventing misassembly of the protector body and the protector cover.

BRIEF DESCRIPTION OF THE DRAWINGS

The foregoing and other features of the inventive concept will be apparent from more particular description of embodiments of the inventive concept, as illustrated in the accompanying drawings in which like reference characters may refer to the same or similar parts throughout the different views. The drawings are not necessarily to scale, emphasis instead being placed upon illustrating the principles of the embodiments of the inventive concept.

Figure 1:
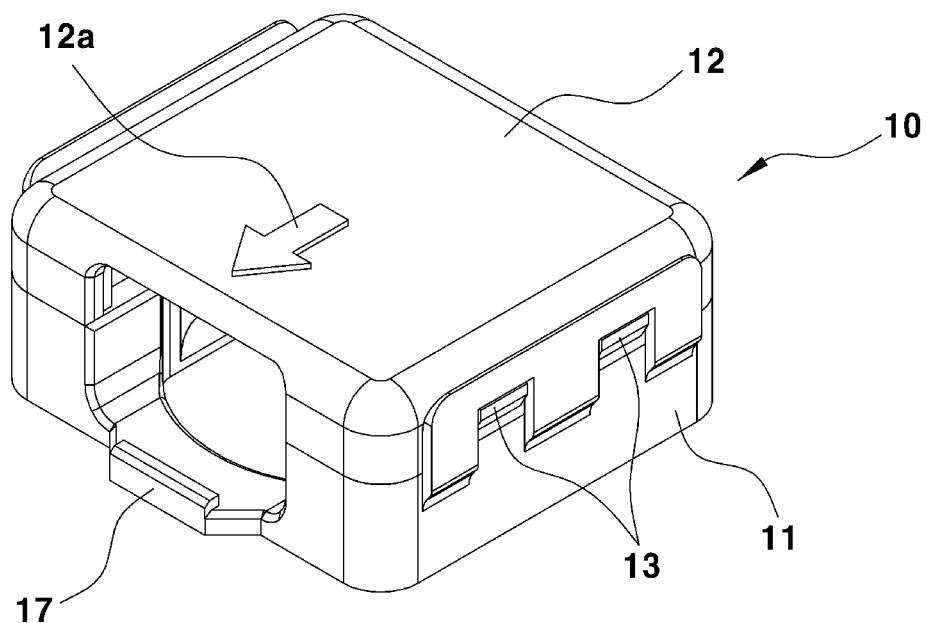
FIG. 1 is a perspective view of an apparatus for insulating an exposed charging part of a fuel cell stack in accordance with the present inventive concept.

Reference numerals set forth in the Drawings includes reference to the following elements as further discussed below:

| | |
|---|---|
| 10: protector | 11: protector body |
| 12: protector cover | 12a: indicator |
| 12b: misassembly-preventing projection | |
| 13: fastening projection | 14: lateral projection |
| 15: fastening hole | 16: projection for temporary assembly |
| 17: direction regulating projection | 18: guide projection |
| 19: contact projection | 20: busbar |
| 21: connection | 30: fuel cell stack |
| 31: end plate | 32: current collector terminal |
| 33: bolt | |

It should be understood that the appended drawings are not necessarily to scale, presenting a somewhat simplified representation of various preferred features illustrative of the basic principles of the inventive concept. The specific design features of the present inventive concept as disclosed herein, including, for example, specific dimensions, orientations, locations, and shapes will be determined in part by a particular intended application and use environment.

In the figures, reference numbers refer to the same or equivalent parts of the present inventive concept throughout the several figures of the drawing.

DETAILED DESCRIPTION

Hereinafter reference will now be made in detail to various embodiments of the present inventive concept, examples of which are illustrated in the accompanying drawings and described below. While the inventive concept will be described in conjunction with exemplary embodiments, it will be understood that present description is not intended to limit the inventive concept to those exemplary embodiments. On the contrary, the inventive concept is intended to cover not only the exemplary embodiments, but also various alternatives, modifications, equivalents and other embodiments, which may be included within the spirit and scope of the inventive concept as defined by the appended claims.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The above and other features of the inventive concept are discussed infra.

Figure 2:
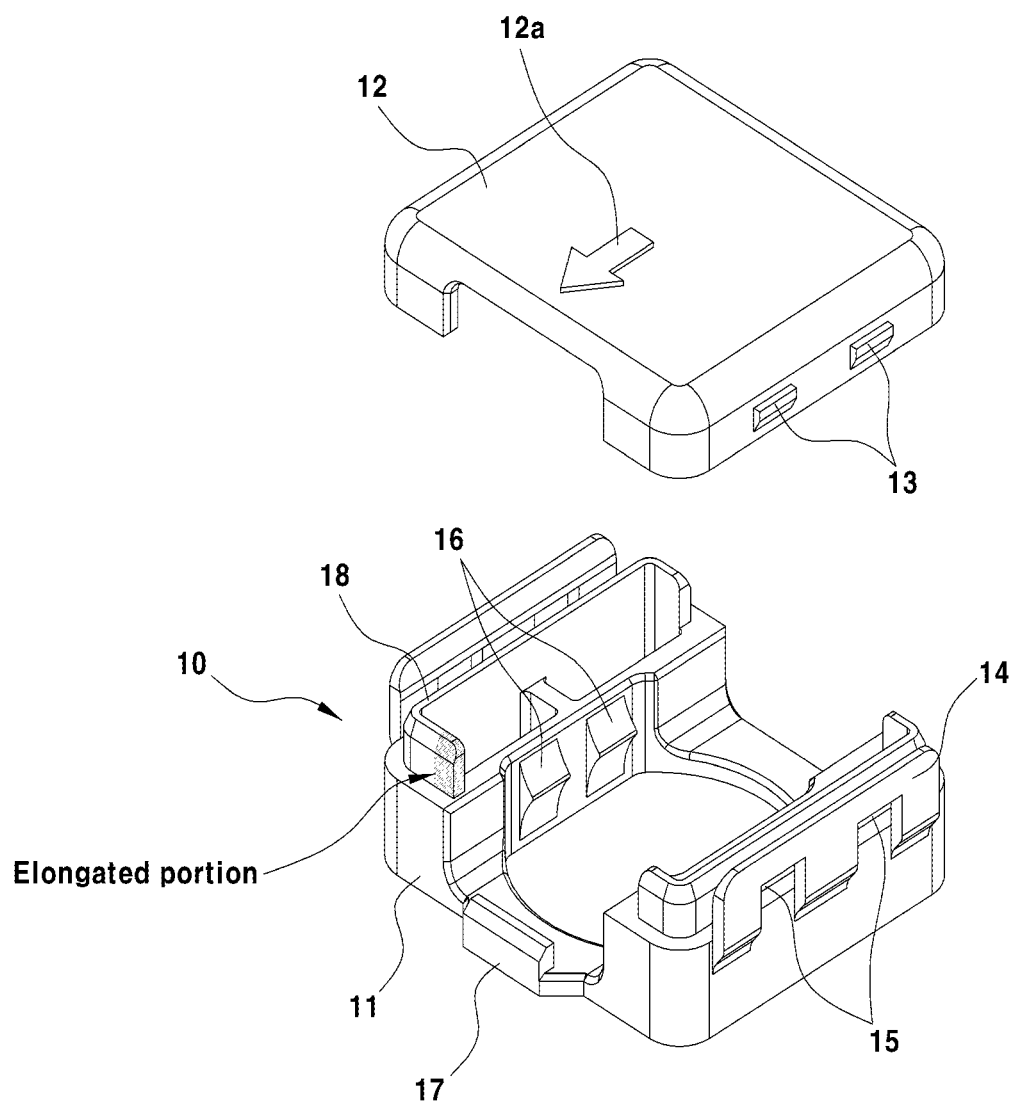
FIG. 2 is an exploded view of FIG. 1.
Figure 3:
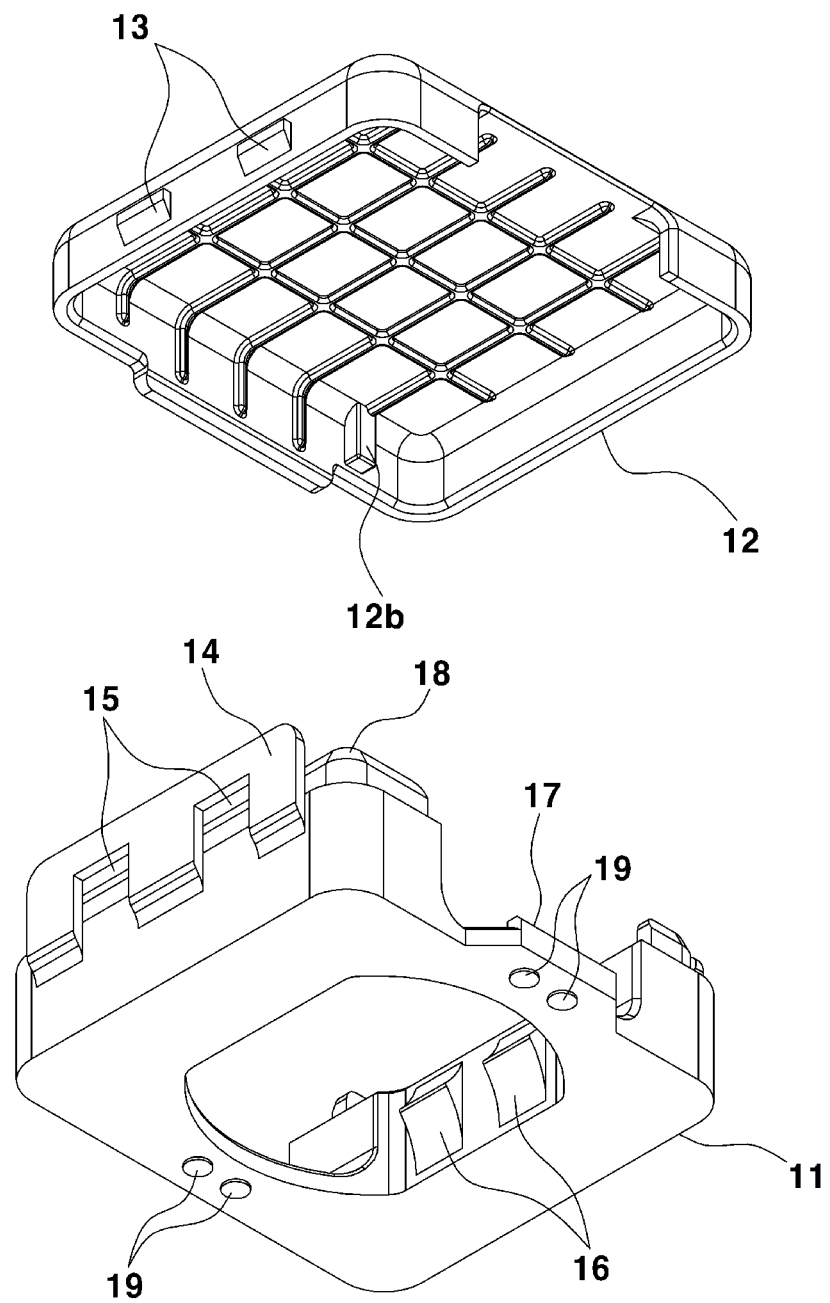
FIG. 3 is a bottom perspective view of a protector body in FIG. 1.
Figure 4:
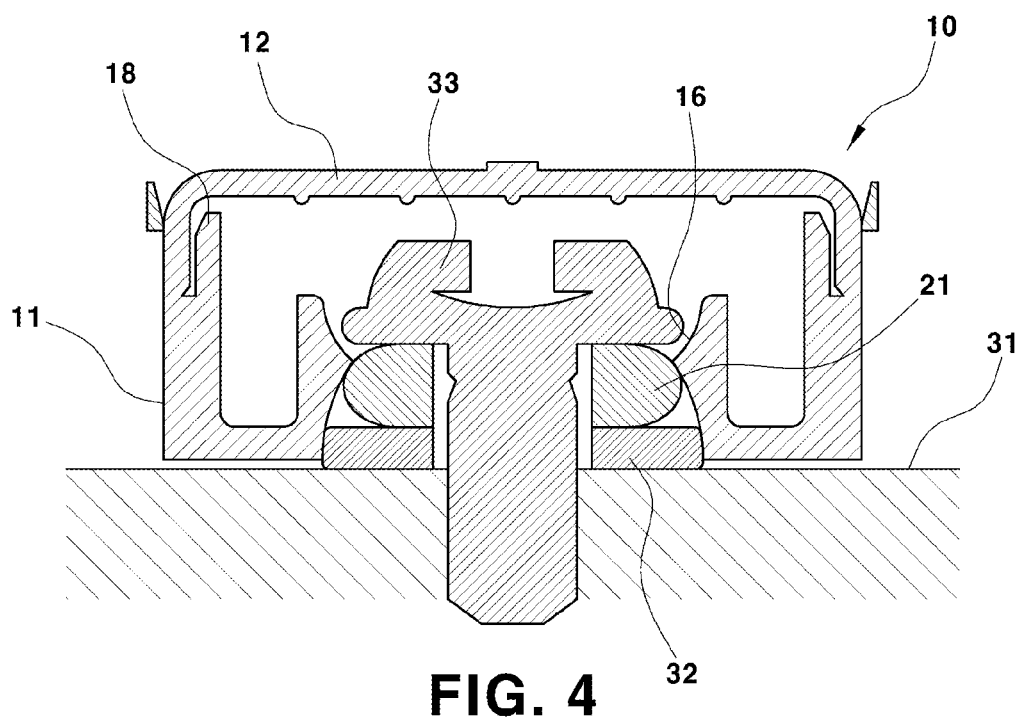
FIG. 4 is a cross-sectional view showing that an exposed charging part is surrounded by a protector in FIG. 1.
Figure 5:
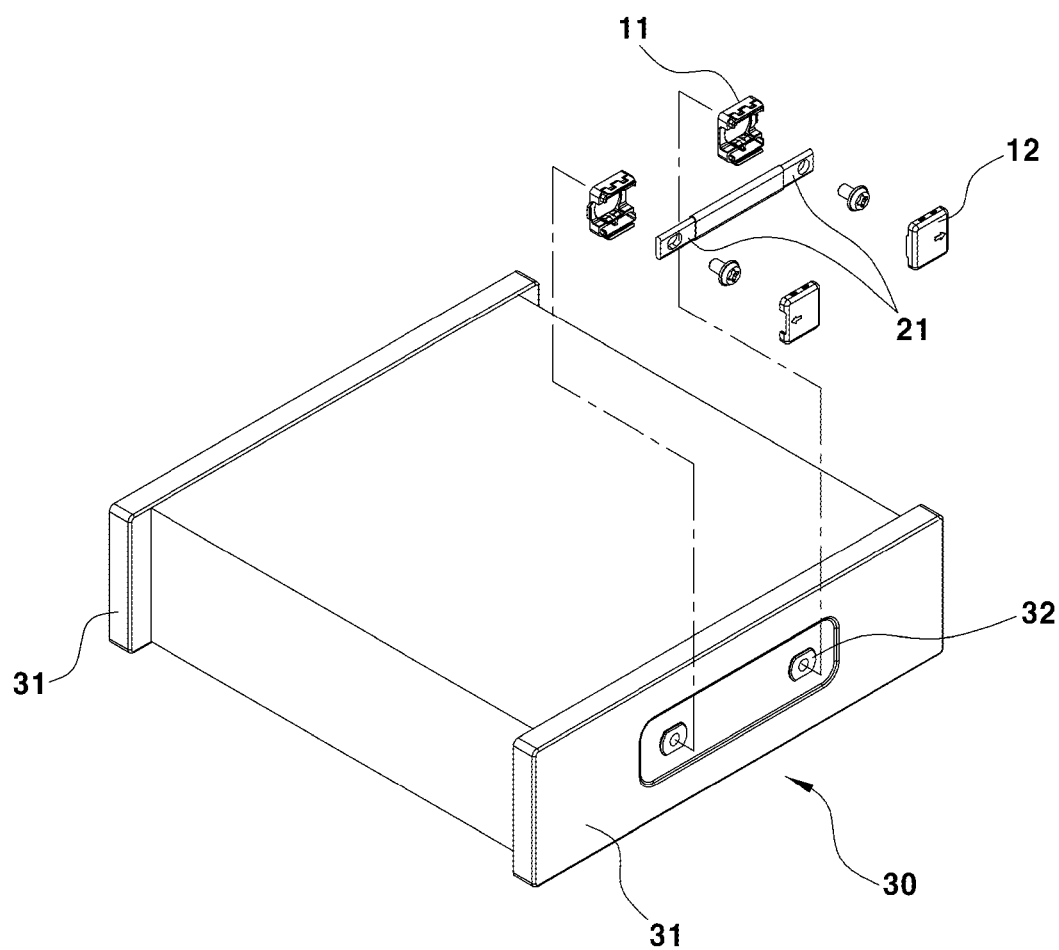
FIG. 5 is an exploded perspective view showing that a protector in accordance with an exemplary embodiment of the present inventive concept is mounted on an exposed charging part of the fuel cell stack.
Figure 6:
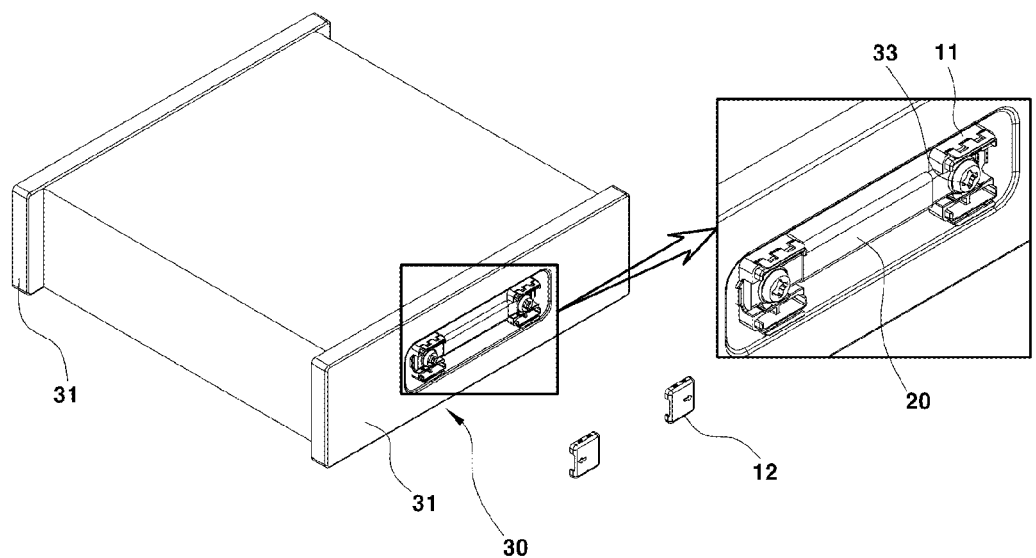
FIGS. 6 and 7 are assembled views of FIG. 5 showing before and after a protector cover is mounted, respectively.
Figure 7:
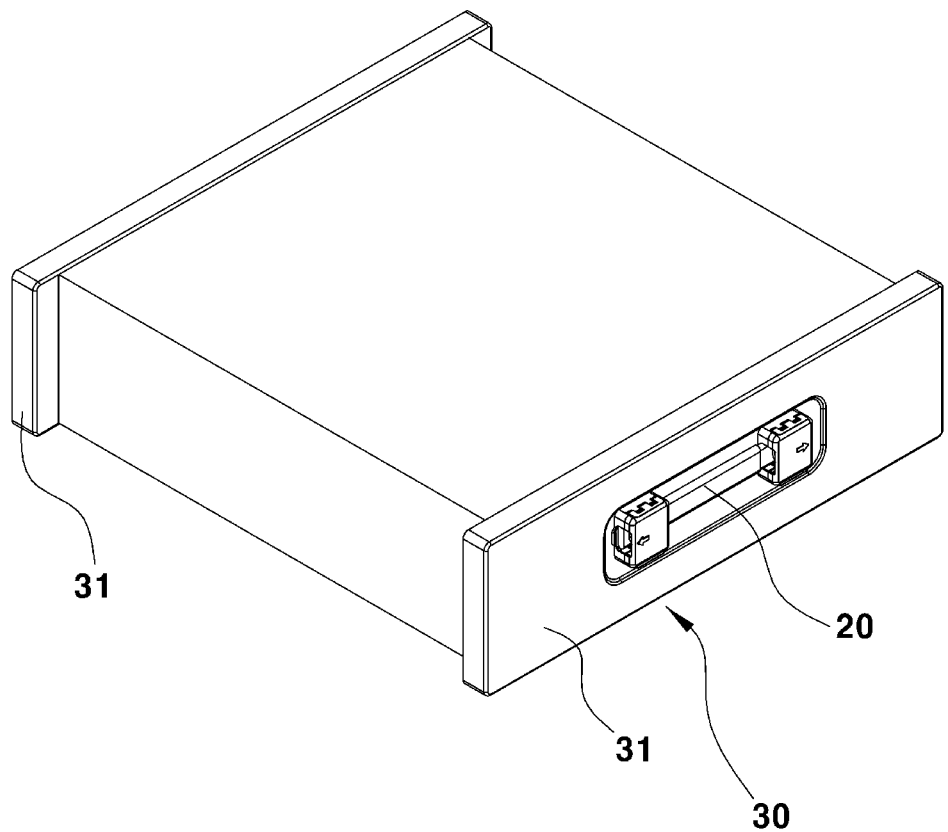
Figure 8:
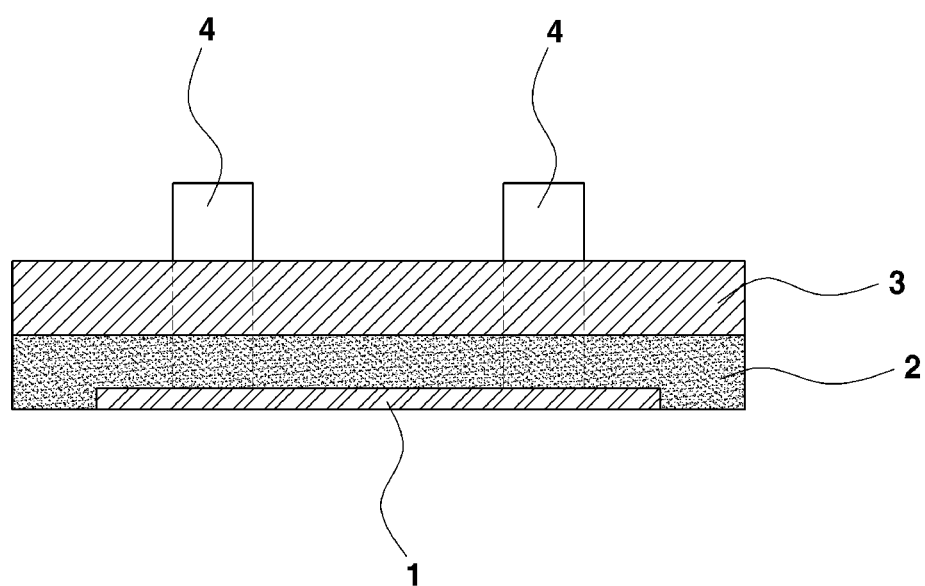
FIG. 8 is a schematic diagram showing a conventional end plate assembly of a fuel cell stack.

FIG. 1 is a perspective view of an apparatus for insulating an exposed live part of a fuel cell stack in accordance with the present inventive concept. FIG. 2 is an exploded view of FIG. 1. FIG. 3 is a bottom perspective view of a protector body in FIG. 1. FIG. 4 is a cross-sectional view showing that an exposed charging part is surrounded by a protector in FIG. 1. FIG. 5 is an exploded perspective view showing that a protector in accordance with an exemplary embodiment of the present inventive concept is mounted on an exposed charging part of the fuel cell stack. FIGS. 6 and 7 are assembled views of FIG. 5 showing before and after a protector cover is mounted, respectively.

Referring to FIG. 5, the present inventive concept provides an apparatus for insulating an exposed live part of a fuel cell stack 30, which can insulate the exposed live part, e.g., electrical connections in an end plate 31 of the fuel cell stack 30.

The exposed charging part may be an electrical connection between each of current collector terminals 32 of the end plate 31 and a busbar 20 (see FIG. 6). The busbar 20 may be made in the form of an elongated bar. When the fuel cell stack 30 is arranged in a single layer or plural layers, for example, in two layers, the current collector terminals 32 of the end plates 31 arranged on both ends of each fuel cell stack 30 may be electrically connected by the busbar 20.

Here, the busbar 20 may be fastened to the current collector terminals 32 of the end plate 31 by means of bolts.

The apparatus for insulating the exposed live part of the fuel cell stack 30 may be configured as a protector 10 (see FIGS. 1, 2 and 5) in the form of a box, so as to protect the exposed live part from crash, deformation, etc., of a vehicle body by surrounding the current collector terminals 32 of the end plate 31 and connections 21 (see FIGS. 4 and 5) of the busbar 20. The apparatus configured as the protector 10 can prevent an electrical short circuit, which is caused when the exposed charging part is brought into direct contact with a metallic stack enclosure by crash or deformation of the vehicle body.

As shown in FIGS. 1 and 2, the protector 10 may include a protector body 11 with an accommodation space therein and a protector cover 12 connected to the top of the protector body 11.

As shown in FIGS. 4 and 5, the protector body 11 may be made in the form of a box and have an accommodation space therein to accommodate and surround the current collector terminals 32 formed in the end plate 31, the busbar 20 connected to the current collector terminals 32, and the bolt 33 for fastening the current collector terminal 32 and the busbar 20.

An oval through hole may be formed at the bottom of the protector body 11 such that the current collector terminals 32 of the end plate 31 are inserted through the through hole into the accommodation space of the protector body 11, and the current collector terminals 32 are surrounded by the protector body 11.

Moreover, a U-shaped opening (see FIG. 2) may be formed on the front and rear sides of the protector body 11, respectively, such that the busbar 20 passes through the protector body 11 in the front and rear direction through the openings, and the current collector terminals 32 accommodated in the protector body 11 and the busbar 20 passing through the protector body 11 are brought into contact with each other and electrically connected.

The protector cover 12 may be made in the form of a box and be connected to the top of the protector body 11 to cover the top of the protector body 11.

Here, an upside-down U-shaped opening (see FIG. 2) may be formed on the front side of the protector cover 12. When the protector cover 12 is connected to the top of the protector body 11, the upside-down U-shaped opening may form a rectangular opening together with the U-shaped opening of the protector body 11.

On the contrary, when the protector cover 12 is connected to the top of the protector body 11, the rear side of the protector cover 12 may be closed and the busbar 20 may pass only through the opening of the protector body 11.

The protector cover 12 may be detachably mounted on the top of the protector body 11 in an inserting manner.

The detachable fastening structure of the protector cover 12 will be described below. Two fastening projections 13 may be formed at a predetermined interval on each of both sides of the protector cover 12. A lateral projection 14 having a pair of fastening holes 15 (see FIGS. 2 and 3), into which the fastening projections 13 are inserted, may be integrally formed on each of both sides of the protector body 11. Moreover, a guide projection 18 (see FIGS. 3 and 4) may project along an edge of the protector body 11 with a gap inside the lateral projection 14. When the protector cover 12 is pressed down from the top of the protector body 11, the fastening projections 13 of the protector cover 12 may be inserted between the guide projection 18 and the lateral projection 14 of the protector body 11 and fastened to the fastening holes 15 formed in the lateral projection 14.

Here, a lower end of the lateral projection 14 may be integrally fixed to the protector body 11, and an upper end thereof may be elastically deformed upward.

Projections 16 (see FIG. 2) for temporary assembly may be formed to face each other at a predetermined interval with the through hole interposed therebetween in the inside of the protector body 11 in such a manner that a pair of projections 16 on each inside of the protector body 11 are formed on the same straight line in the front and rear direction, so that the protector body 11 can be temporarily assembled with the connections 21 of the busbar 20 by the projections 16 for temporary assembly.

A direction regulating projection 17 (see FIG. 2) may be formed on a lower end of the front side of the protector body 11 and project upward from a projection that slightly projects from the lower end of the front side of the protector body 11 to regulate an assembly direction during assembly with the busbar 20, thus preventing misassembly.

Moreover, in order to regulate the assembly direction of the protector body 11 and the protector cover 12, an arrow-shaped indicator 12a may be formed on the protector cover 12 such that the protector cover 12 is assembled with the protector body 11 in such a manner that the direction of the arrow is directed to the direction regulating projection 17 of the protector body 11.

Furthermore, in order to prevent misassembly of the protector cover 12 and the protector body 11, a misassembly-preventing projection 12b (see FIG. 3) may be formed on the inside of the protector cover 12. When the arrow direction of the protector cover 12 is in the opposite direction of the direction regulating projection 17 of the protector body 11, for example, during the assembly, the misassembly-preventing projection 12b may make it impossible to assemble the protector cover 12 and the body 11.

In more detail, the misassembly-preventing projection 12b may be formed on the inner side of the edge of the protector cover 12, for example, on the opposite side of the direction of the arrow, i.e., on the inner side of the rear edge of the protector cover 12, more precisely, biased to one side of the rear edge in the left and right direction. One end of a guide projection 18, located on one side, among the guide projections 18 formed on both sides of the protector body 11, may be more elongated than the other guide projections 18 such that, during misassembly, the misassembly-preventing projection 12b interferes with the guide projection 18 more elongated than the other guide projection 18, thus preventing misassembly.

In other words, the protector cover 12 and the body 11 may have different widths and lengths, respectively, so that a side in the width direction of the protector cover 12 and a side in the length direction of the protector body 11 do not overlap each other to cause misassembly. Accordingly, the protector cover 12 and the body 11 may be misassembled only when the arrow direction of the protector cover 12 is 180° opposite to the direction of the direction regulating projection 17 of the protector body 11. To avoid this missembly, when the protector cover 12 and the body 11 are correctly assembled in such a manner that the arrow direction of the protector cover 12 coincides with the direction of the direction regulating projection 17 of the protector body 11, the misassembly-preventing projection 12b of the protector cover 12 may not interfere with the guide projection 18 of the protector body 11. Otherwise, the misassembly-preventing projection 12b of the protector cover 12 may interfere with the guide projection 18 of the protector body 11, which makes it impossible to assemble the protector cover 12 and the body 11, thus preventing misassembly.

Here, when the arrow direction of the protector cover 12 coincides with the direction of the direction regulating projection 17 of the protector body 11 without the above-described misassembly-preventing structure of the protector cover 12 and the body 11, it is possible to prevent misassembly of the protector cover 12 and the body 11. However, the above-described misassembly-preventing structure is provided to prevent the protector cover 12 and the body 11 from being misassembled in a case that the direction of the arrow marked on the protector cover 12 is 180° opposite to the direction of the direction regulating projection 17 of the protector body 11 due to a worker's mistake.

Contact projections 19 (see FIG. 3) may be formed on the bottom of the protector body 11 to prevent a vibration noise due to tolerances during assembly of parts.

For example, two contact projections 19 may be formed at a predetermined interval on the bottom of the direction regulating projection 17 located at the front end of the protector body 11. Two contact projections 19 may be formed at a predetermined interval at the rear end of the protector body 11.

Next, an assembly method of the apparatus for insulating the exposed live part of the fuel cell stack 30 having the above-described configuration will be described below.

First, referring to FIG. 5, four protector bodies 11 may be connected to the connections 21 of the busbar 20 (see FIG. 6) fastened to the current collector terminals 32 of the end plate 31 in an inserting manner that the direction regulating projections 17 of two protector bodies 11 are directed to both ends of the busbar 20 such that the direction regulating projections 17 of the two protector bodies 11 face opposite to each other.

In this case, the ends of the busbar 20 may be brought into contact with the direction regulating projections 17 in such a manner that four protector bodies 11 are assembled with the connections 21 of the busbar 20 using the projections 16 for temporary assembly of the protector body 11.

Then, referring to FIG. 6, the busbar 20 to which the protector bodies 11 are assembled may be fastened to the current collector terminals 32 of the end plate 31 using the bolts 33.

Here, the protector bodies 11 may accommodate the current collector terminals 32 (see FIG. 5) of the end plate 31 through the through hole at the bottom, and be brought into contact with the end plate 31. The fastening holes 15 formed in the current collector terminals 32 of the end plate 31 may be matched with bolt holes formed in the connections 21 of the busbar 20, and then the busbar 20 may be fastened to the end plate 31 by means of the bolts 33.

Continuously, referring to FIG. 7, the protector covers 12 may be connected to the protector bodies 11 to cover the connections 21 of the busbar 20 connected by means of the bolts 33 and the top of the protector bodies 11.

Here, the fastening projections 13 (see FIGS. 1 and 2) of the protector cover 12 may be inserted into the fastening holes 15 of the lateral projection 14 of the protector body 11 such that the protector cover 12 fastened to the protector body 11 is maintained.

The protector 10 may be made of an insulating material such as plastic to provide an insulating function to prevent a short circuit.

Therefore, according to an embodiment of the present inventive concept, the exposed charging part of the fuel cell stack is surrounded and insulated by the protector body 11 and the protector cover 12 which are made in the form of a box, respectively. Thus, it is possible to prevent an electrical short circuit, which is caused when the exposed charging part is brought into direct contact with the metallic stack enclosure by crash or deformation of the vehicle body, and to apply the protector 10 with a single shape to a variety of output terminals, thus reducing the manufacturing cost.

Moreover, it is possible to regulate the assembly direction of the busbar 20 and the protector 10 using the direction regulating projection 17 formed at the front end of the protector body 11 and the arrow marked on the protector cover 12, thus preventing misassembly.

Furthermore, it is possible to temporarily assemble the busbar 20 and the protector body 11 in an inserting manner using the projections 16 for temporary assembly formed on the inside of the protector body 11, thus improving assemblability.

In addition, it is possible to prevent a vibration noise due to tolerances during assembly of parts using the contact projections 19 formed on the bottom of the protector body 11.

As described above, the apparatus for insulating the exposed live part of the fuel cell stack according to the present inventive concept has the following advantages.

First, the exposed charging part of the fuel cell stack is surrounded and insulated by the protector body and the protector cover which are made in the form of a box, respectively, and thus it is possible to insulate the exposed charging part, prevent a short circuit of the exposed charging part, and reduce the manufacturing cost by applying the protector with a single shape to a variety of output terminals.

Second, it is possible to regulate the assembly direction of the busbar and the protector using the direction regulating projection formed at the front end of the protector body and the arrow marked on the protector cover, thus preventing misassembly.

Third, it is possible to temporarily assemble the busbar and the protector body in an inserting manner using the projections for temporary assembly formed on the inside of the protector body, thus improving assemblability.

Fourth, it is possible to prevent a vibration noise due to tolerances during assembly of parts using the contact projections formed on the bottom of the protector body.

The inventive concept has been described in detail with reference to exemplary embodiments thereof. However, it will be appreciated by those skilled in the art that changes may be made in these embodiments without departing from the principles and spirit of the inventive concept, the scope of which is defined in the appended claims and their equivalents.

What is claimed is:

1. An apparatus for insulating a plurality of exposed live parts of a fuel cell stack, the apparatus comprising:
   a plurality of protectors,
   wherein each of the plurality of protectors is made of an insulating material and configured to insulate a corresponding one of the plurality of exposed live parts to which a corresponding one of current collector terminals disposed in an end plate of the fuel cell stack and a corresponding one of connections of a busbar are connected,
   wherein each of the protectors comprises:
   a protector body contactable with the end plate and accommodating the corresponding current collector terminal of the end plate fastened by means of a bolt and the corresponding connection of the busbar; and
   a protector cover connected to the protector body and covering the corresponding exposed live parts,
   wherein at least one of the protectors comprises:
   a direction regulating projection disposed on a lower end of a front side of the protector body; and
   an arrow-shaped indicator disposed on a front end of the protector cover and indicating a direction of the direction regulating projection, thus preventing misassembly of the protector and the busbar.

2. The apparatus of claim 1, wherein the protector body and the protector cover are made in the form of a box, respectively, are configured to have a substantially same shape to be commonly applied to a variety of exposed live parts, and provide an insulating function to prevent a short circuit.

3. The apparatus of claim 1, wherein the protector body comprises:
   a plurality of projections for temporary assembly disposed to face each other at a predetermined interval in the inside of the protector body such that the protector body is temporarily assembled with the corresponding connection of the busbar in an inserting manner without being assembled with the corresponding current collector terminal of the end plate, thus improving assemblability.

4. The apparatus of claim 1, wherein the protector comprises:
   a lateral projection disposed on each of both sides of the protector body and having a pair of fastening holes; and
   a fastening projection disposed on each of both sides of the protector cover to be inserted into each of the fastening holes,
   wherein the protector body and the protector cover are detachably connected to each other.

5. The apparatus of claim 1, wherein the protector comprises:
   a plurality of contact projections disposed on a bottom of the protector body to prevent a vibration noise due to tolerances during assembly of parts.

6. The apparatus of claim 1, wherein the protector further comprises:
   a guide projection disposed on each of both ends the protector body; and
   a misassembly-preventing projection disposed on the protector cover and configured to interfere with the guide projection, thus preventing misassembly of the protector body and the protector cover.

* * * * *